United States Patent [19]

de Nijs et al.

[11] Patent Number: 4,647,713

[45] Date of Patent: Mar. 3, 1987

[54] PRESSURIZED TELECOMMUNICATION CABLE JOINT CLOSURE METHOD AND APPARATUS

[76] Inventors: Jacob de Nijs, 3, rue de Mamer, Kehlen; John R. Hawkins, 24, rue Belair, Mamer, both of Luxembourg; William H. Fuller, 201 Bazinsky Rd., Vicksburg, Miss. 39180

[21] Appl. No.: 664,649

[22] Filed: Oct. 25, 1984

[51] Int. Cl.$^4$ .......................................... H02G 15/24
[52] U.S. Cl. ................................. 174/21 R; 138/162; 138/166; 174/92
[58] Field of Search ................... 174/21 R, 21 JS, 92, 174/DIG. 8; 138/162, 163, 166

[56] References Cited

U.S. PATENT DOCUMENTS

| | | | |
|---|---|---|---|
| 985,539 | 2/1911 | Ottney | 138/162 |
| 3,183,302 | 4/1965 | Wochner et al. | 174/92 |
| 3,447,986 | 6/1969 | Kasahara | 174/92 |
| 3,455,336 | 7/1969 | Ellis | 138/156 |
| 3,484,541 | 12/1969 | Campbell | 174/138 |
| 3,578,026 | 5/1971 | Meyer, Jr. | 174/92 X |
| 3,770,556 | 11/1973 | Evans et al. | 428/77 X |
| 3,879,574 | 6/1975 | Filreis et al. | 174/76 |
| 4,153,747 | 5/1979 | Young et al. | 428/40 |
| 4,268,559 | 5/1981 | Smuckler | 428/36 X |
| 4,380,686 | 4/1983 | Moisson | 174/84 |
| 4,392,014 | 7/1983 | Trumble et al. | 174/92 |
| 4,426,413 | 1/1984 | Fentress | 428/36 |
| 4,466,846 | 8/1984 | Wolf et al. | 174/DIG. 8 X |
| 4,472,222 | 9/1984 | Moisson et al. | 174/DIG. 8 X |
| 4,472,468 | 9/1984 | Tailor et al. | 428/57 |
| 4,490,422 | 12/1984 | Pascher | 174/DIG. 8 |
| 4,518,819 | 5/1985 | Larsson et al. | 174/78 |
| 4,533,788 | 8/1985 | Pokojny | 174/85 |

FOREIGN PATENT DOCUMENTS

| | | | |
|---|---|---|---|
| 2105900 | 11/1971 | Fed. Rep. of Germany | 174/21 R |
| 2304852 | 8/1974 | Fed. Rep. of Germany | 174/92 |
| 614477 | 12/1948 | United Kingdom | 174/92 |
| 1065431 | 4/1967 | United Kingdom | |

OTHER PUBLICATIONS

"Jointing of Plastic-Sheathed Cables", The International Telegraph and Telephone Consultative Committee, published by the International Telecommunication Union, Geneva, 178, Section 4.2.2., Method 2.

*Primary Examiner*—Arthur T. Grimley
*Assistant Examiner*—Morris H. Nimmo
*Attorney, Agent, or Firm*—Limbach, Limbach & Sutton

[57] ABSTRACT

This invention relates to a pressurized telecommunication cable joint closure method and apparatus. Provided is a cylinder comprising a pair of semicylindrical shell members connected together along one elongate edge of each member and releasable securing means on the other elongate edge of each member. The securing means comprises a plurality of projections on one member edge and a matching plurality of receiving means on the other member edge whereas the projections extend radially inward and lie within a plane containing the longitudinal axis of one of the shell members. The cylinder further has interleaved rectilinear fingers at the ends that are for sealing to joined cables. A heat shrinkable wraparound member is used to enclose the cylinder and joined cables.

18 Claims, 14 Drawing Figures

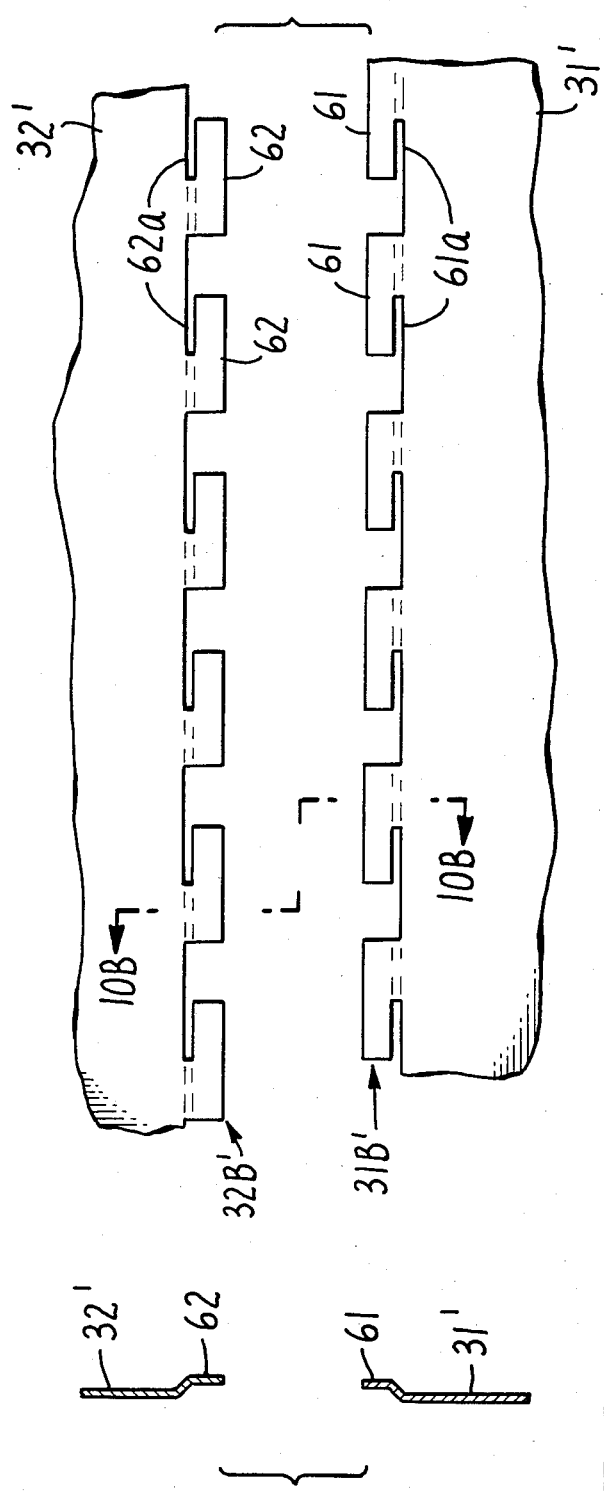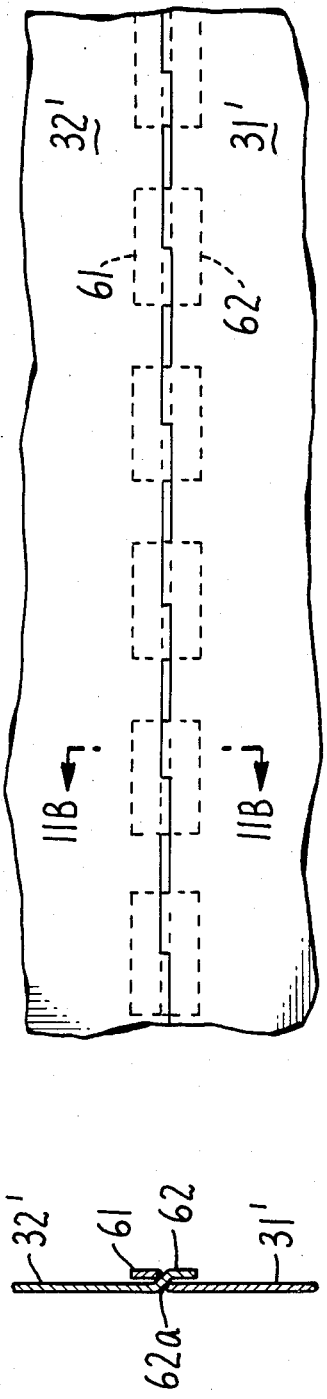

PRESSURIZED TELECOMMUNICATION CABLE JOINT CLOSURE METHOD AND APPARATUS

DESCRIPTION

Technical Field

The present invention relates in general to a pressurized telecommunications cable joint closure method and apparatus.

Methods and apparatus for sealably enclosing cable joints in pressurized telecommunication cable systems present a number of different problems. Currently there are generally three commercially available closure systems for pressurized telecommunication cable joints. These can be generally characterized as (a) injection welding systems, (b) heat shrinkable wraparound systems, and (c) bolted enclosure systems.

The existing injection welding systems entail long installation times, complicated procedures, and expensive equipment and result in a cable joint that is not easily reenterable. A typical injection welding pressurized telecommunication cable joint closure system is described in "Jointing of Plastic-sheathed Cables" The International Telegraph and Telephone Consultative Committee, published by the International Telecommunication Union, Geneva, 1978 Section 4.2.2. Method 2.

An illustrative example of a pressurized cable closure system using a heat shrinkable wraparound is U.S. Pat. No. 4,466,846. A heat shrinkable member of the type described in U.S. Pat. No. 3,455,336 can be utilized to enclose and seal the pressurized joint. A major disadvantage to this type of closure system is the complexity of the structures making up the closure system and their installation. More importantly, these systems are marginally capable of maintaining a pressurized seal during repeated high and low temperature cycles to a degree encountered by such systems and typically established as part of the testing procedure for qualification of any closure system as an acceptable joint repair method and apparatus.

In the bolted type enclosure system enclosure members with rubber grommets need to be aligned, assembled and clamped and bolted together. These systems suffer from difficulties with many mechanical parts which require time consuming alignment.

Sleeve liners of various configurations have been disclosed for cable joint closures in the past. United Kingdom Patent Specification No. 1,065,431, published Apr. 2, 1967 discloses a cable joint enclosure which includes a metal sheet with scissors type cuts from the end to form fingers which are distorted from the plane of the sheet so the sheet can be wrapped in tubular form and the fingers sliding over one another from a tapered end portion. United Kingdom Patent Specification No. 614,477, accepted Dec. 16, 1948 discloses a closure with truncated conical portions with slits inward from the smaller end forming tongues which engage a cable projecting outwardly from the enclosure. U.S. Pat. No. 3,879,574 discloses a polymeric plastic sheet which is grooved to define rectangular and end triangular patterns for an enclosure liner. U.S. Pat. No. 4,426,413 discloses a sleeve with slotted end portions forming a tapered transition and U.S. Pat. No. 4,380,686 discloses a liner with folding lines and tapered slots to permit tapered ends.

The object of the present invention is to provide a pressurized, telecommunication cable joint closure method and apparatus which employs a quick installation procedure similar to that used on nonpressurized closures without the necessity for expensive equipment and which produces a closure which is easily reenterable.

Broadly stated, the present invention, to be described in greater detail below, is directed in general to a pressurized, telecommunication cable joint closure method and apparatus employing a heat shrinkable sealing wraparound product around a cannister formed of a pair of elongate, hollow, semicylindrical shell members connected together along one elongate edge of each member and releasably secured together along the other elongate edge thereby forming a hollow cylinder which is easily closed mechanically and minimizes air gaps.

One feature and advantage of the present invention is the ability of this method and apparatus sealably to enclose the pressurized cable joint within the cannister which can be easily reentered if need be.

Another feature of the present invention is that the structural elements of the closure system are utilized in a fashion similar to elements currently employed in nonpressurized cable heat shrinkable wraparound joint closures. Thus, training in the use of the present invention will be minimal.

In accordance with another aspect of the present invention, the securing means of the cannister includes a plurality of projections extending from one of the semicylindrical shell members and a corresponding plurality of receiving means on the other of said shell members for receiving the projections whereby the securing means holds the shells together against substantial relative movement in either circumferential direction.

It has been found that after repeated wide range temperature cycles of a closure system under pressure incorporating conventional means for securing a pair of shells together air gaps and leaks are produced as a result of expansion, contraction, expansion, contraction, etc. of the closure assembly. The prevention of relative movement of the shell parts in either circumferential direction in accordance with the last mentioned aspect of this invention avoids the creation of gaps and leaks.

In a preferred embodiment of the present invention the projections making up the securing means for the shell members extend substantially radially inward of said shell members and are contained in a plane containing the longitudinal axis of the shell members.

A feature and advantage of the last aforementioned aspect of the present invention is that a cannister is produced which can be easily closed and then reopened but which prevents relative circumferential movement of the semicylindrical shell members during wide range thermal cycles under pressure.

In accordance with another aspect of the present invention an alternative securing means is provided wherein the projections extend substantially circumferentially of the shell members and also extend longitudinally of the shells and interlock with the other shell member against circumferential relative movement of the shell members.

In accordance with another aspect of the present invention the pressurized cable joint closure method and apparatus comprises a hinged cannister sealed within a heat shrinkable wraparound with fingers at the end of the cannister sealed interiorly with a mastic sealant to the cables which exit the closure. The mastic sealant is in compression rather than in peel and thus will prevent creation of leaks in spite of repeated temperature cycling of the pressurized cable.

In accordance with still another aspect of the present invention the cannister is provided with substantially rectilinear fingers around the circumference at each end of the hollow cylinder with the fingers being twisted in the same direction about the longitudinal axis of the finger whereby the fingers can be interleaved and compressed around a sealant on one of the cables.

One feature and advantage of the construction of this last mentioned aspect of this invention is that the same cannister can be used for a wide range of cable diameters and the ends of the cannister closely fit about the cable without allowing air gaps which will produce leaks in the system after repeated thermal cycles.

In accordance with still another aspect of the present invention the tips of the fingers are bent outwardly along their longitudinal length and also include at least a portion of the surface thereof arched outwardly widthwise of the finger.

The cannister's construction in accordance with the last aforementioned aspect of this invention provides a better seal between the cannister fingers and the cables.

These features and advantages of the present invention will become more apparent upon a perusal of the following specification taken in conjunction with the accompanying drawings wherein similar characters of reference refer to similar aspects of the present invention in each of the several views.

BRIEF DESCRIPTION OF DRAWINGS

FIG. 6 is a perspective view illustrating a cannister as utilized in the closure system in accordance with the present invention.

FIG. 10A is a plane view of another embodiment of the present invention with the opposing edges of two shell sections, shifted longitudinally relative to one another ready for engagement.

FIG. 10B is a sectional view of a portion of the structure shown in FIG. 10A taken along line B—B in the direction of the arrows.

FIGS. 11A and 11B are views similar to FIGS. 10A and 10B but with the two shell sections connected together and shifted longitudinally.

BEST MODE FOR CARRYING OUT THE INVENTION

Figure 1:
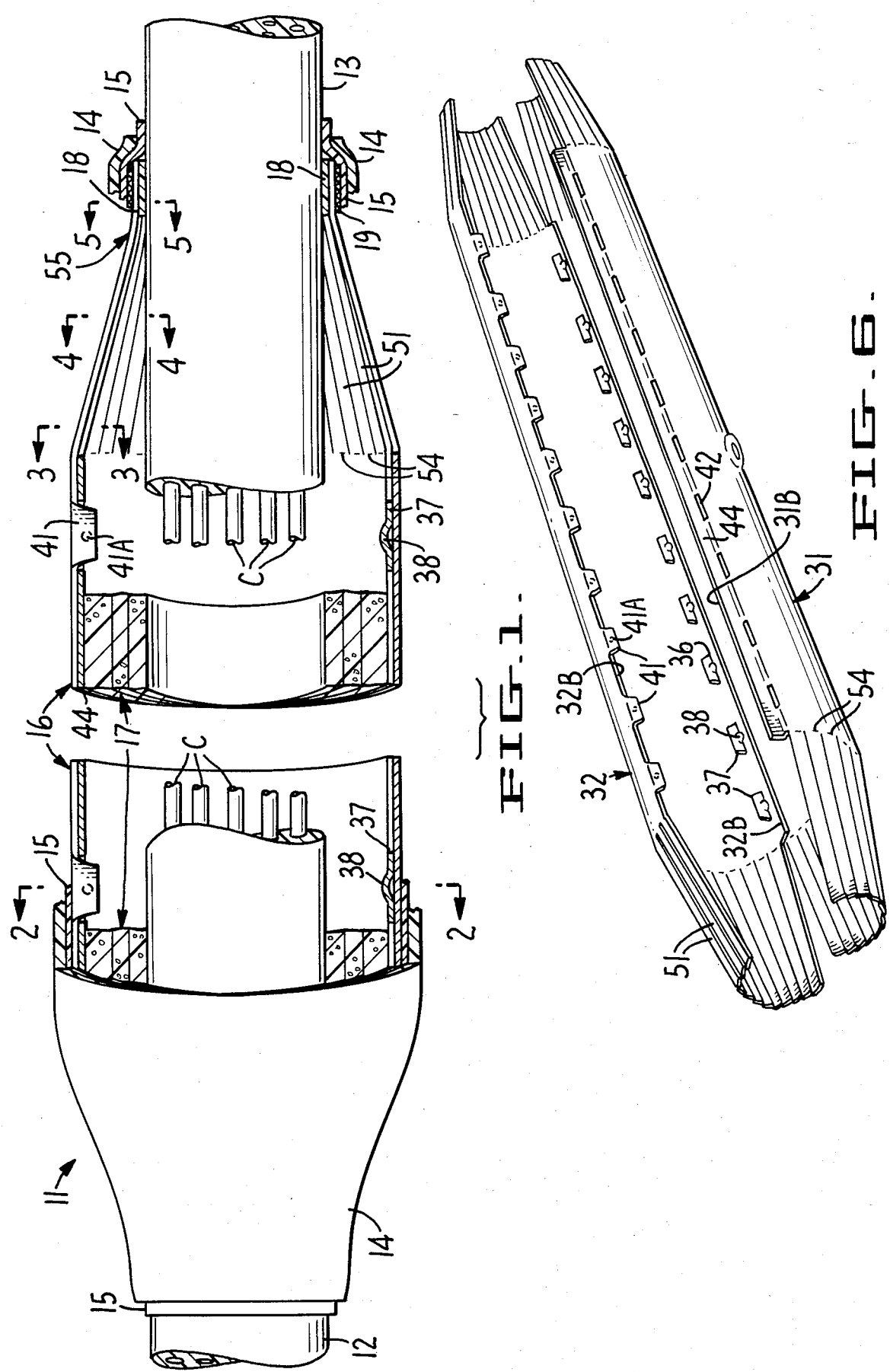
FIG. 1 is a foreshortened, elevational view, partially in section and partially broken away, illustrating the present invention.

Referring now to the drawing, with particular reference to FIGS. 1-9, a pressurized, telecommunications cable joint closure 11 is schematically illustrated wherein a pair of cables 12 and 13 having internal pressure applied along their length are joined together and enclosed within a heat shrinkable wraparound member 14 which is provided with a hot melt adhesive 15 and surrounding a cannister 16, such as of aluminum, which in turn surrounds a heat resistant foam 17 secured to the inside surface of the cannister and surrounding the cable joint. A mastic sealant 18 at the ends of the cannister makes a joint with the outside surface of the cables 12 and 13.

In FIG. 1 the parts of the assembly have been progressively broken away toward the central foreshortened portion of the assembly. The cables 12 and 13 include a multitude of conductors C which are schematically illustrated and which would be interconnected in the foreshortened portion of the closure.

The heat shrinkable wraparound 14 may take several different configurations including heat shrinkable members which include physically engaging structures along the elongate edges of the wraparound such as illustrated in U.S. Pat. No. 3,770,556 to Evans et al. and U.S. Pat. No. 4,268,559 to Smuckler. However, the invention is ideally suited for use with a wraparound shrinkable closure of the type described and illustrated in U.S. Pat. No. 4,153,747 to Young et al. and assigned to the assignee of the present application. As the heat shrinkable closure 14 is described and illustrated in the Young et al. U.S. Pat. No. 4,153,747, the wraparound includes a stretched section 23 which shrinks upon application of heat and a pair of end sections 24 and 25 which are not heat shrinkable and which are provided with appropriate adhesive layers for joining the ends sections 24 and 25 together.

As best shown in FIG. 6, the cannister 16 is formed of a pair of hollow, semicylindrical cannister shell members 31 and 32 which have elongate edges which are joined together in pairs 31A and 32A and 31B and 32B to form a hollow cylinder around the cable joint.

Along one of the elongate edges 31A and 32A of the cannister shells 31 and 32, respectively, a hinge 33 is formed which permits the cannister to open for surrounding the joint and close around the joint in a manner which will maintain the sealed integrity of the closure system. The hinge 33 is one which avoids gaps which can open up leak paths during thermal cycles under pressure. The hinge prevents shell movements during repeated expansion, contraction, expansion, contraction, etc. of high range thermal cycles.

Figure 8:
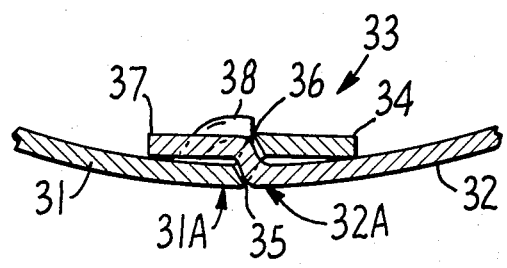
Figure 4:
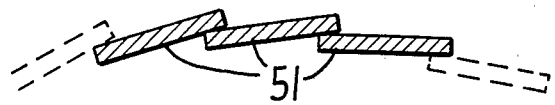

The particular hinge 33 illustrated in FIG. 8 of the preferred embodiment includes a reduced radius flap extension 34 along the edge 31A of one of the cannister shells 31 with the flange 35 connecting the flap extension 34 to the shell 31 having a plurality of uniformly spaced-apart slots 36 for receiving a corresponding number of circumferential projections 37 extending from the adjacent edge 32A of the other cannister shell 32. The projections 37 include locking tabs 38 formed by punching a portion of the projection 37 out of its plane and these projections 37 prevent removal of the projections 37 from the slots 36.

Figure 7:
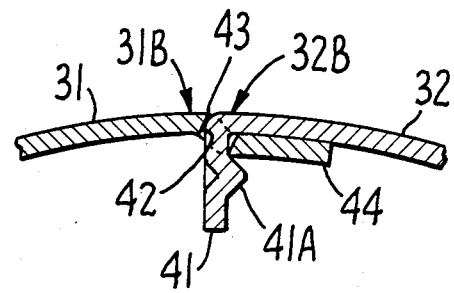
FIGS. 7 and 8 are enlarged fragmentary sectional views of the locking and hinging portions of the cannister shown in FIG. 6.
Figure 3:
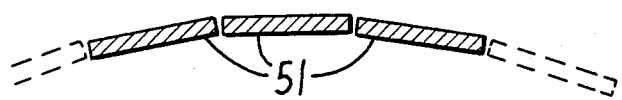
FIGS. 3, 4 and 5 are enlarged cross-sectional views of portions of the structure shown in FIG. 1 taken along lines 3—3, 4—4 and 5—5 in the direction of the arrows.

The structure for releasably securing together the unhinged edges 31B and 32B of the shells 31 and 32, respectively, best illustrated in FIGS. 6 and 7 includes a plurality of spaced-apart projections 41 which extend substantially radially inward from the cannister shell 32 in a plane containing the longitudinal axis of the shell 32. For closing the cannister these radial projections 41 are extended through slots 42 in the flange 43 connecting shell 31 with a circumferentially directed flap extension 44. The extension 44 is positioned radially inward from the remainder of the shell 32. The extensions 41 can be provided with locking projections 41A which help prevent removal of extensions 41 from slots 42 during closure of the cannister 16.

While the flap extensions 34 and 44 could be on opposite shells 31 and 32 and the projections 37 and 41 could be on opposite shells 31 and 32, from a fabrication standpoint it is convenient to provide both sets of projections 37 and 41 on one shell 32 and both sets of flap extensions 34 and 44 with the accompanying slots 36 and 42 on the other shell 31.

Figure 2:
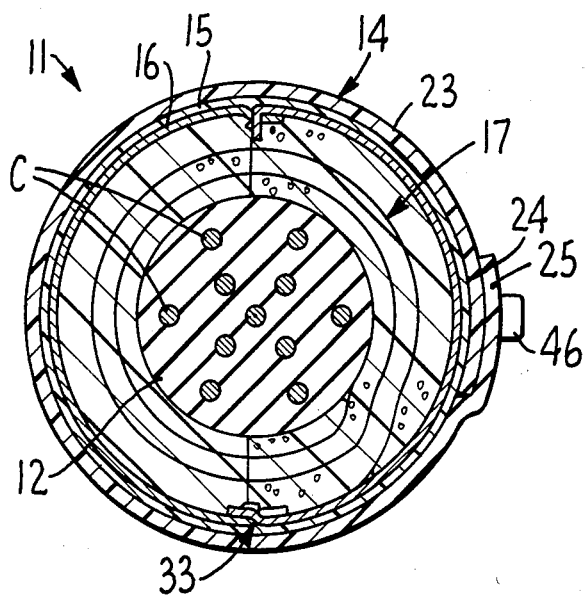
FIG. 2 is a cross-section view of a portion of the structure shown in FIG. 1 taken along line 2—2 in the direction of the arrows.

Because the assembly is provided for pressurized telecommunication cable joint closures, the cannister 16 is provided in one of the cannister shells with a pressure fitting 46 sealably mounted in an aperture therethrough as shown in FIG. 2. The location of the aperture is positioned such that the pressure fitting 46 is positioned through openings in the nonshrinking end sections 24 and 25 of the heat shrinkable wraparound 14.

Both ends of each of the cannister shells 31 and 32 are provided with a plurality of end fingers 51 which interleave and can be compressed in around the outside surface of the cables 12 and 13 which exits through the ends of the cannister 16.

As shown in FIGS. 1, 3–6 and 9, fingers 51 are substantially rectilinear in shape and formed by slits extending longitudinally from the end of each of the cannister shells 31 and 32. When the shells 31 and 32 are slit, each of the fingers 51 is twisted in the same direction about the longitudinal axis of the finger so that when radial inward pressure is applied uniformly to the fingers for clamping down on a cable, the fingers move together radially inward interleaved and partially overlapping so as not to leave any air gaps for escape of the sealant 18 used to seal the end of the cannister 16 to the cables 12 and 13. For facilitating use of the cannister 16 with cables of various different diameters, the fingers 51 are partially bent inward at the base 54 of the finger where the finger joins the main body of the cannister shell.

Figure 5:
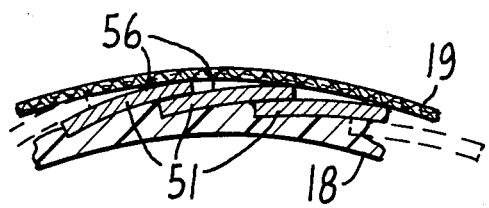
Figure 6A:
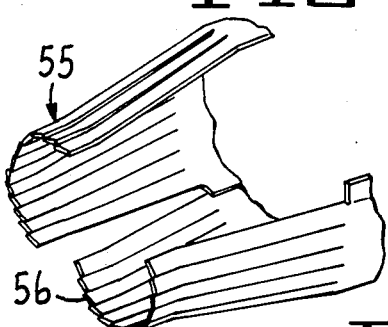
FIG. 6A illustrates a preferred configuration of the fingers at the end of the cannister shell shown in FIG. 6.
Figure 9:
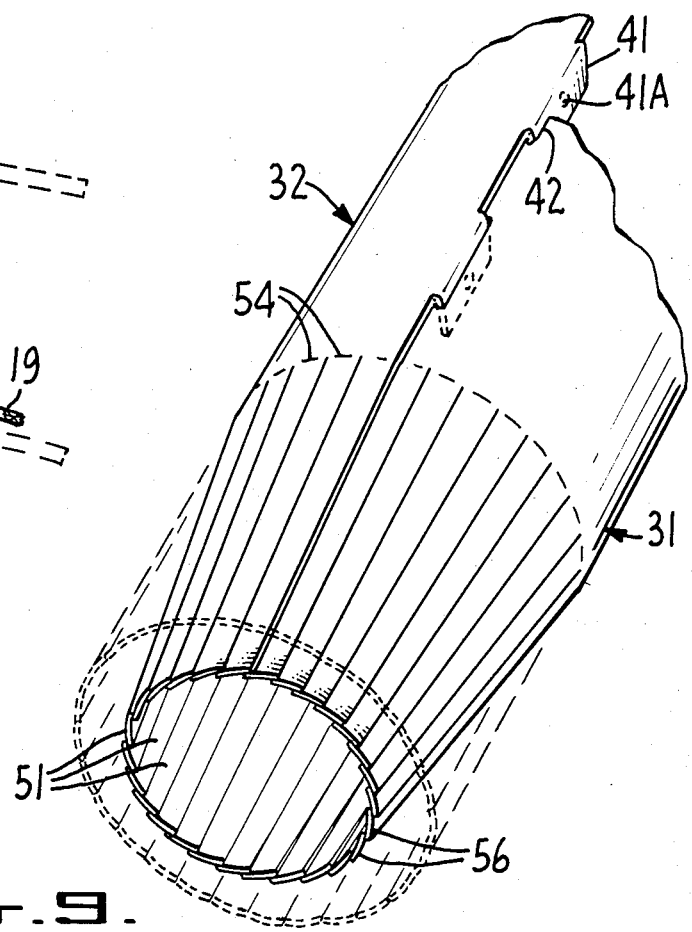
FIG. 9 is a perspective view of the end of the cannister shown in FIG. 6 and illustrating the fingers for enclosing the cannister around a cable.

Referring to FIGS. 1, 5 and 6A it has been discovered that a better seal can be achieved between the cannister and the mastic tape typically used around the cable by having the tips of the fingers 51 bent outwardly at 55 from the longitudinal axis of the respective finger toward the free end of the finger and having at least a portion of each finger 51 toward the free end thereof arched outwardly widthwise of the finger as shown at 56 in FIG. 5 for a pressurized telecommunication cable enclosure. The bent and arched fingers 51 of a cannister shell prior to use are illustrated in FIG. 6A.

By way of illustration, an example of the operative use of the present invention is hereby given. In the process of making the electrical connection between cables 12 and 13 appropriate lengths of insulation are removed from the individual conductors of the appropriate cables and for a sufficient distance along the exterior of each of the cables 12 and 13. After the electrical connection is made, appropriate electrical insulation is applied to the joint. The mastic sealant 18 is wrapped around the cables 12 and 13 in the regions to be engaged by the end fingers 51. The cannister 16 with its interior heat resistant foam is centered over the splice bundle and the open seam is closed by pressing the projections 41 in the slots 42. The fingers 51 are sealably clamped down on the mastic tape 18 such as by wound glass cloth 19 around the ends of the fingers 51. The heat shrinkable wraparound 14 is then wrapped around the cannister 16 with the end sections 24 and 25 of the wraparound then secured together. Next, heat is applied to the shrinkable wraparound 14 which shrinks down upon and seals via the hot melt adhesive 15 around the cannister 16 and the external surface of the cables 12 and 13.

The hot melt adhesive flows into what few cracks and gaps exist in the joints of the cannister 16.

With a wraparound 14 40 inches long and a cannister 16 30 inches long and 3.75 inches in diameter and mastic sealing tape 1.5 inches wide, a pressurized telecommunication cable joint closure was formed around 1.25 inches cable. The closure failed to produce a leak upon cycling over 100 times between temperature limits of +5° C. to +60° C. under water with a cycle time of four hours wherein the temperature change occurs by draining the cycle tank at one temperature extreme and refilling with water at the opposite temperature extreme within 40 minutes while the closure is under a pressure of 10 psi.

While the preferred embodiment of the present invention includes the rectilinear shaped fingers 51 which interleave with one another when clamped down upon the cable, the cable joint closure method and apparatus of the present invention also can be employed with a hinged cannister which includes slotted ends producing tapered fingers and wherein a mastic sealant tape is provided on the inside surface of the fingers to create the seal between the ends of the cannister and the cable. With this construction when the mastic tape sealant is held in compression rather than in peel, the pressure from the interior of the pressurized cable forces the mastic sealant up against the fingers without creating a leak in the sealing structure.

The cannister shell members can be joined together other than by the preferred hinge 33. Thus, for example, a plurality of projections 41 and slots 42 could be utilized in place of the hinge 33, and the shell members held together by metal straps surrounding the cannister 16 or adhesives which melt at temperatures above 60° C.

Referring now to FIGS. 10 and 11, there is shown an alternative construction for the securing means of the cannister and wherein projections on one shell member extend both circumferentially and longitudinally for engagement with receiving means on the other shell member. The edges 31B' and 32B' of the cannister shells 31' and 32' include, respectively, a plurality of equally spaced apart locking tabs 61 and 62 projecting toward the other shell. The tabs 61 and 62 are slotted along their bases halfway along the length of the tabs with slots 61a and 62a, respectively, of a width to receive a tab from the opposite shell. The tabs are bent inward along their bases so the tabs themselves have a radius from the axis of the cannister less than the radius of the main cannister wall. Thus, each of the tabs 61 and 62 extends substantially circumferentially and longitudinally of the cannister and cannister shells. The shells 31' and 32' are joined by projecting the tabs (in the relative longitudinally shifted position of the shells 31' and 32' shown in FIG. 10A) through the slots in the opposite shell and then shifting the shells longitudinally relative to one another whereby the tabs 61 and 62 are interengaged as shown in FIG. 11A. This same connection structure can be utilized at the other edges 31A and 32A.

The terms and expressions which have been employed here are used as terms of description and not of limitations and there is no intention, in the use of such terms and expressions of excluding equivalents of the features shown and described, or portions thereof, it being recognized that various modifications are possible within the scope of the invention claimed.

We claim:

1. In a pressurized telecommunications cable joint closure apparatus in which a joint between cables is formed and sealed under pressure, a support cannister comprising a pair of elongate, hollow, semicylindrical shell members connected together along one elongate edge of each member and means for releasably securing such shell members together at least along the other elongate edge of each member to form a hollow cylinder, said securing means including a plurality of projections extending from one of said semicylindrical shell members and a corresponding plurality of receiving means on the other of said shell members for receiving said projections, said projections extending substantially radially inwardly of one of said semicylindrical shell members and lying within a plane containing the longitudinal axis of said one shell member.

2. In the cable joint closure apparatus of claim 1, a plurality of substantially rectilinear fingers around the circumference of such hollow cylinder at each end thereof, each of said fingers at the same end of said shell members being twisted in the same direction about the longitudinal axis of said finger whereby said fingers can be interleaved and compressed around one of the cables.

3. In the cable joint closure apparatus of claim 2, the tips of said fingers being bent outwardly from the longitudinal axis of said respective fingers.

4. In the cable joint closure apparatus of claim 5, at least a portion of the surface of each of said fingers arched outwardly widthwise of the finger.

5. In the cable joint closure apparatus of claim 1, a heat shrinkable wraparound for surrounding and shrinking down upon and sealably enclosing said support cannister.

6. In the cable joint closure apparatus of claim 5, said wraparound member having a stretched central section which shrinks upon application of heat, a pair of heat stable end sections, means for joining said end sections and a hot melt adhesive on the inside surfaces of said wraparound for sealing with said cannister.

7. In a pressurized, telecommunications cable joint closure apparatus in which a joint between cables is formed and sealed under pressure, a support cannister comprising a pair of elongate, hollow, semicylindrical shell members hingedly connected together along one elongate edge of each member, and means for releasably securing such shell members together along the other elongate edge of each member to form a hollow cylinder, said securing means when engaged holding said shell members against substantial relative movement in either circumferential direction, said securing means including a plurality of projections extending from one of said semicylindrical shell members and a corresponding plurality of receiving means on the other of said shell members for receiving said projections, said projections extending substantially radially inwardly of one of said semicylindrical shell members and lying within a plane containing the longitudinal axis of said one shell member.

8. In the cable joint closure apparatus of claim 7, a heat shrinkable wraparound for sealably surrounding and enclosing said support cannister.

9. In the cable joint closure apparatus of claim 8, said wraparound member having a stretched central section which shrinks upon application of heat, a pair of heat stable end sections, means for joining said end sections and a hot melt adhesive on the inside surface of said wraparound for sealing with said cannister.

10. A pressurized telecommunications cable joint closure surrounding a joint between at least a pair of cables comprising a sealant material surrounding each of said cables a hollow cylinder surrounding the joint said cylinder including a pair of hollow semicylindrical shell members connected together along one elongate edge of each member, means releasably securing said shell members together along at least the other elongate edge of each member to form a hollow cylinder, said securing means having a plurality of projections extending from one of said semicylindrical shell members through a corresponding plurality of receiving means in the other of said shell members for holding said shell members when engaged against substantial relative movement in either circumferential direction, each of said cylindrical shell members having a plurality of slits longitudinally from each end of the shell member forming a plurality of interleaved rectilinear fingers at the ends of said shell members, means for sealably clamping said fingers of said shell to said sealant material, a wraparound member heat shrunk down over said cylinder and said cables and a hot melt adhesive sealing the region between said wraparound member and said cylinder and sealing said wraparound member to said cables.

11. The cable joint closure of claim 10 wherein said plurality of said projections extend substantially radially inwardly of one of said shell members and lie within a plane containing the longitudinal axis of said one shell member.

12. The cable joint closure of claim 10 wherein said projections extend substantially circumferentially of said shell members and include means extending longitudinally of said shell members interlocking with said receiving means.

13. The method of enclosing a pressurized cable joint between at least a pair of cables comprising the steps of providing sealing material around the cables and spaced apart by a given distance, joining a pair of semicylindrical shell members together along one pair of their elongate edges, releasably joining said pair of shell members together along at least the other pair of their elongate edges, holding said releasably joined edge of said shell members against any substantial relative movement, clamping interleaved fingers slit from the ends of said shell members against said sealing material, and shrinking a sealing member down on said joined shell members and flowing a hot melt adhesive around the joined shell members to seal the openings therein.

14. The method of claim 13 wherein said releasably joining step includes
projection portions of one of said shell members radially inward through said other of said shell members.

15. The method of claim 13 wherein said releasably joining step includes projecting portions of one of said shell members circumferentially and longitudinally of the other of said shell members.

16. The method of claim 13 including the steps of bending said fingers partially inward at the base of said fingers and bending the tips of the fingers outwardly from the longitudinal finger axes.

17. The method of claim 16 including bending at least a portion of each finger archedly outwardly widthwise of the finger.

18. The method of claim 13 wherein said step of joining said shell members together along said one pair of edges includes hingedly joining said shell members together along said one pair of edges.

* * * * *